United States Patent [19]

Vahabzadeh et al.

[11] Patent Number: 5,047,937
[45] Date of Patent: Sep. 10, 1991

[54] ENGINE CVT CONTROL SYSTEM

[75] Inventors: Hamid Vahabzadeh, Rochester; Samuel M. Linzell, Troy, both of Mich.

[73] Assignee: General Motors Corporation, Detroit, Mich.

[21] Appl. No.: 531,676

[22] Filed: Jun. 1, 1990

[51] Int. Cl.5 .............................................. B60K 41/18
[52] U.S. Cl. .................................... 364/424.1; 74/866
[58] Field of Search ....................... 74/866, 857, 865; 364/424.1

[56] References Cited

U.S. PATENT DOCUMENTS

| | | | |
|---|---|---|---|
| 3,324,740 | 6/1967 | Lewis et al. | 74/472 |
| 4,383,456 | 5/1983 | Ganoung | 74/866 |
| 4,458,560 | 7/1984 | Frank et al. | 74/857 |
| 4,459,878 | 7/1984 | Frank | 74/857 |
| 4,509,125 | 4/1985 | Fattic et al. | 364/424.1 |
| 4,546,673 | 10/1985 | Shigematsu et al. | 74/866 |
| 4,572,031 | 2/1986 | Yokooku et al. | 74/866 |
| 4,593,581 | 6/1986 | Omitsu | 74/866 |
| 4,601,680 | 7/1986 | Tokoro et al. | 474/11 |
| 4,644,820 | 2/1987 | Macey et al. | 74/689 |
| 4,682,518 | 7/1987 | Takada et al. | 74/867 |
| 4,699,025 | 10/1987 | Omitsu | 74/866 |
| 4,710,879 | 12/1987 | Vahabzadeh | 364/424.1 |
| 4,747,325 | 5/1988 | Morimoto | 74/866 |
| 4,782,934 | 11/1988 | Takano et al. | 192/73 |
| 4,803,900 | 2/1989 | Ohkumo | 74/866 |

OTHER PUBLICATIONS

Ironside, J. M., and Stubbs, P. W. R., "Microcomputer Control of an Automotive Perbury Transmission", C200/81 Proc. of 3rd Intl. Conference on Automotive Electronics, Mechanical Engineering Publication, 1981.
Stubbs, P. W. R., "The Development of a Perbury Traction Transmission for Motor Car Applications", ASME Paper No. 80 C2/DET 59, Aug. 1980.

Primary Examiner—Salvatore Cangialosi
Attorney, Agent, or Firm—Mark A. Navarre

[57] ABSTRACT

A control system for an engine-CVT drivetrain controls the ratio rate of the CVT to control the speed of the vehicle engine, providing a means for improved control over the transient response of the engine-CVT drivetrain.

5 Claims, 4 Drawing Sheets

5,047,937

ENGINE CVT CONTROL SYSTEM

An engine CVT control system utilizes CVT ratio rate control to control the speed of a vehicle engine.

BACKGROUND OF THE INVENTION

Continuously variable transmissions (CVT's) are transmissions that change ratio continuously, not in discrete intervals. This continuous nature of CVT's gives them an infinite number of gear ratios, making them very attractive for automotive uses. One attractive aspect is that higher efficiency of the engine may result because it can be run at a desired speed for a broad range of vehicle speeds, allowing an efficient engine operating point for the specific power requirement.

Previously, there have been various methods to control the ratio of the CVT. The most straight forward way is to define a target CVT ratio in response to a particular parameter and then adjust the control valve of the CVT in a manner to achieve that ratio. Change in the CVT ratio may cause the operating point of the engine to change. The limitation of the above basic system is that there is no control over the speed/torque path followed by the engine when the target CVT ratio is being achieved. The speed/torque path of the engine between operating points is referred to as the engine transient response path.

Other prior engine-CVT control systems do not allow for variable response paths of the engine, resulting in no direct control over the engine response path. Still other systems achieve some direct control over transient response but fail to achieve complete control because there is no independent control over the speed and torque of the engine.

What is desirable in driving an engine-CVT system is independent control over the speed and torque of the engine. Independent control over engine speed and engine torque would allow for increased flexibility over the speed/torque response path of the engine. For example the transition between operating points of the engine could be done more efficiently, or could be done to provide increased engine torque output, or could be done in any variety of ways a system designer would choose. Furthermore, independent control of the engine speed and engine torque would allow for increased flexibility over the acceleration/deceleration response (transient response) of the vehicle. Previous systems fail to achieve independent control over engine speed and engine torque and, as a result, have limited control over the transient responses of the engine and vehicle.

SUMMARY OF THE PRESENT INVENTION

This invention uses CVT ratio rate control as a means of controlling the engine speed to a value that, with a given throttle position, will produce a desired/commanded power output. This type of control thus enables independent control of engine speed (by CVT ratio rate) and torque (by engine throttle position) for producing a desired engine power output. The result is that the speed/torque path followed when the engine is changing from one operating point to another can be controlled.

The improved controller means develops a desired engine speed command in response to an operator demand. The engine speed command is then compared to the actual engine speed. An input element of the CVT is then positioned in a manner determined as a function of the comparison between the actual engine speed and the engine speed command to affect a real time control of the CVT ratio rate and hence engine speed in response to operator demand.

The engine torque may be either directly controlled by the operator, or according to another aspect of this invention, by a separate control loop which positions the throttle in response to operator demand to provide the desired engine torque. In the latter case, both engine speed and engine torque are controlled so that the speed/torque path followed when the engine is changing from one operating point to another can be tailored to achieve a specified control objective. A companion case, U.S. Pat. application, Ser. No. 531,675, filed June 1, 1990 is directed to an improved method of controlling the speed/torque path of the engine when changing from one operating point to another to provide improved vehicle performance. This improved method of control is also described in the detailed description below.

DETAILED DESCRIPTION OF THE INVENTION

Figure 1:
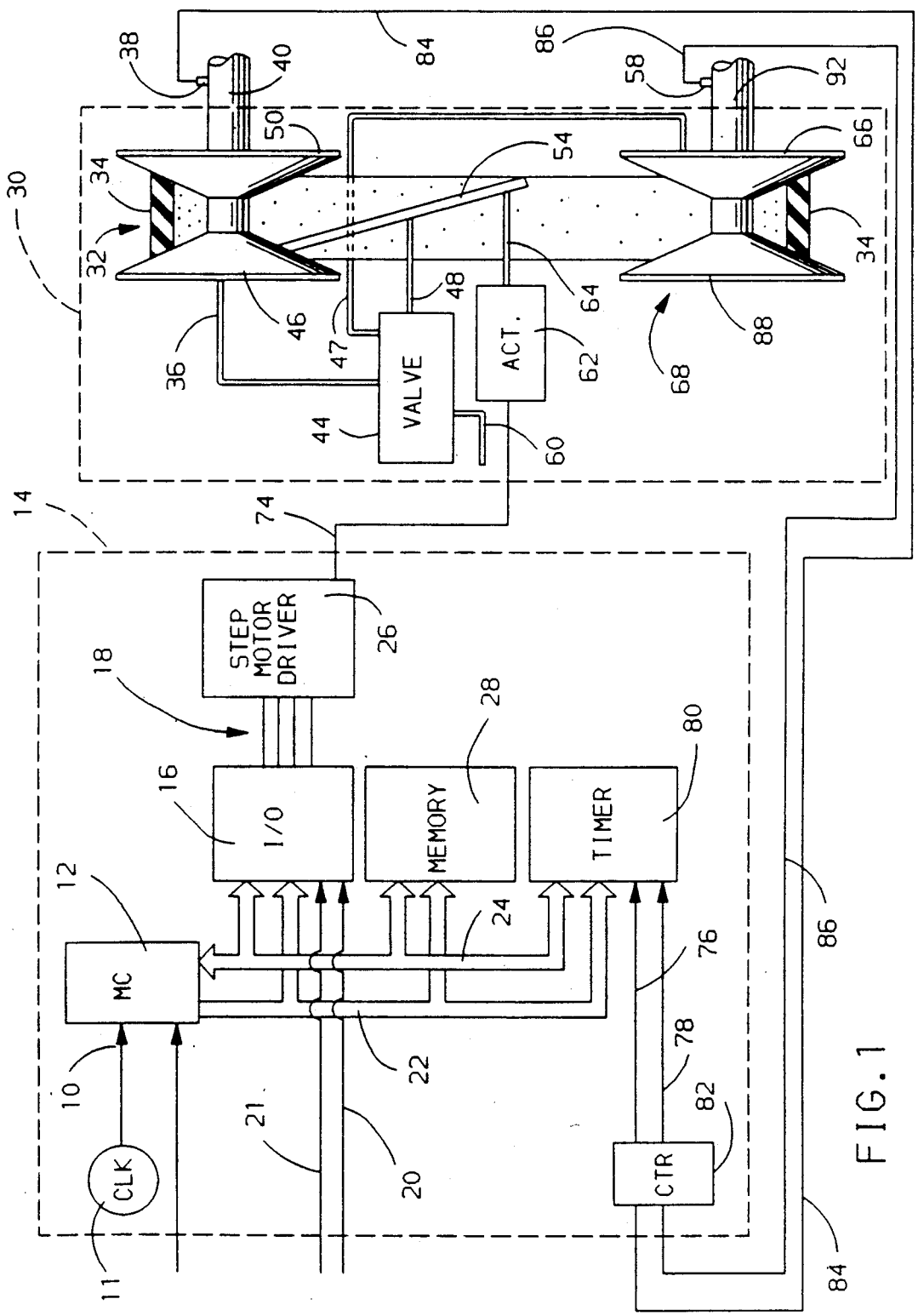
FIG. 1 is a hardware drawing of the CVT control system.

Referring to FIG. 1, the control unit is designated generally by the number 14 and the continuously variable transmission is designated generally by the number 30. The control unit includes clock 11, microcomputer 12, input/output unit 16, step motor driver 26, memory unit 28, timer 80, and counter 82. The transmission includes input pulley 32, output pulley 68, actuator 62, pressure control valve 44, V-belt 34, and input and output shafts 40 and 92. It will be understood that the present invention is not limited to the use of CVT's with pulley/V-belt power transfer. The present invention is operational with any other type of CVT in which the ratio rate can be controlled, including hydrostatic and friction CVT's.

In the control unit 14, the clock 11 provides operational clock pulses to the microcomputer 12 through line 10. The microcomputer 12 controls the in/out unit 16, the memory unit 28, and the timer 80 through control bus 22. Bi-directional data bus 24 provides for the transfer of data between the in/out unit 16, the memory unit 28, the timer unit 80, and the microcomputer 12. Line 20 carries a signal representing the operator's desired shift (e.g., Park Neutral, Drive), and line 21 carries a signal representing the operator's desired mode of operation of the CVT, e.g., economy or performance. As will be explained below, the invention can be used in combination with a control method that provides different modes of operation of the vehicle because of the increased control of engine transient response resulting from the invention.

The input/output unit 16 controls step motor driver 26 through control lines designated generally as 18. The step motor driver 26 provides a signal to the CVT 30 through line 74.

In the CVT 30, the actuator 62 receives the control signal through line 74. In response to the control signal, the actuator 62 moves the lever 54, connected to the actuator shaft 64, to control the ratio rate of the transmission 30. The lever 54 is connected to the actuator shaft 64 at one end and to the positionable pulley half 46 at the other end. At a point between the two ends, the lever 54 is pivotably connected to the valve rod 48. This arrangement provides position feedback of the pulley to the valve. As the actuator 62 moves the lever 54, valve 44, in response to the movement of the valve shaft 48, alters the hydraulic pressure in lines 36 and 47. Hydraulic pressure is provided to the valve through line 60 which is connected to a pressure source (not shown). As the pressure in lines 36 and 47 is altered, pulley halves 46 and 66 move, changing the ratio of the CVT 30 at a rate dependent upon the speed of the movement of the pulley halves. As pulley half 46 moves, the lever 54 moves repositioning the valve shaft 48, providing a means for the valve 44 to stop the positionable pulley halves 46 and 66 from moving.

The ratio rate of the CVT is controlled by controlling the speed of the movement of lever 54 by actuator 62. The faster the actuator 62 moves lever 54, the faster the ratio $N_o/N_i$ changes.

The speed $N_i$ of the input shaft 40, also the speed of the engine (not shown), is sensed by sensor 38 and fed to the controller 14 through line 84. The speed $N_o$ of the output shaft 92 is sensed by sensor 58 and fed back to the controller through line 86.

Lines 84 and 86 are fed into counter 82 in the controller 14. The counter 82 counts the number of rotations of the input shaft 40 and the output shaft 92 separately and feeds the counts to the timer 80 through lines 76 and 78. With the information provided by the timer 80, the microcomputer can compute the rotational speeds of the input shaft 40 and the output shaft 92 of the CVT. The implementation of the present invention into the above described hardware will be further explained below.

Figure 2:
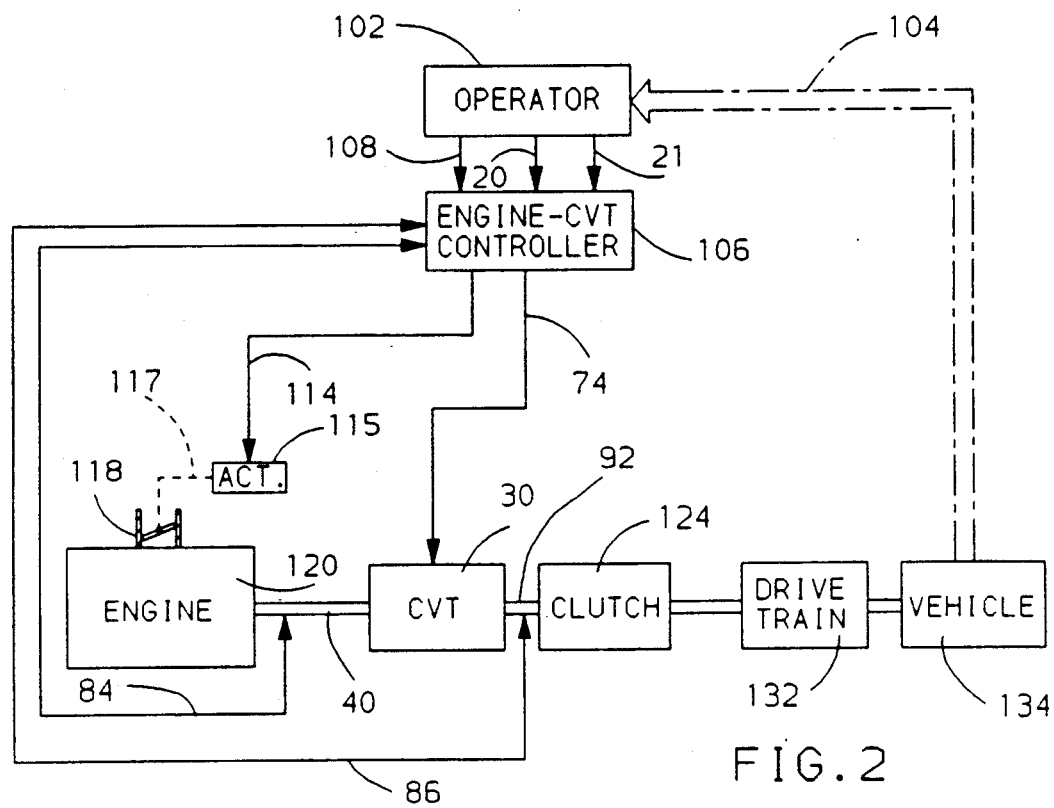
FIG. 2 is a block diagram showing the relationship between the controller, the engine and the CVT.

Referring to FIG. 2, box 102 represents the vehicle operator, box 106 represents the engine-CVT controller. Throttle 118 controls the torque output of the engine 120, which outputs its power through the engine output shaft. The output shaft is connected to the input shaft 40 of the CVT 30. The CVT transfers the engine power to the CVT output shaft 92, which may be connected to a clutch 124 to engage and disengage the engine to and from the road load. The clutch 124 need not be positioned after the CVT 30, it may also be positioned between the engine output shaft and the CVT input shaft 40. The output shaft 92 transfers the engine's power to the final drive 132 which moves the vehicle 134. All of the above components of the engine-CVT drive train transfer the load of the vehicle back to the engine 120.

The operator 102 perceives the state of the vehicle through normal senses, represented by feedback line 104. The operator depresses or releases the gas pedal (not shown) sending a power request command to the controller 106 through line 108. The operator sends the select signal (e.g., Park, Neutral, Reverse) to the controller 106 through line 20 and the mode signal (e.g., economy or performance) through line 21. In the preferred implementation, the invention is used in combination with a control method that has two control modes to control the transient response of the CVT. Both of those modes will be explained in further detail below.

The controller senses the state of the engine and CVT through lines 84 and 86. Line 84 senses the rotational speed of the engine shaft, which is also the speed of the input shaft 40 of the CVT 30. Line 86 senses the rotational speed of the output shaft 92 of the CVT 30. In response to the power request command and the engine and CVT states, the controller 106 sends a throttle command through line 114 and a ratio rate command through line 74. The signal in line 114 controls operation of a throttle actuator 115 which positions the throttle 118 through the actuator shaft represented by dotted line 117, controlling the torque output of engine 120. The ratio rate command on line 74 controls the ratio rate of the CVT 30 by controlling actuator 62 (FIG. 1) as described above. Controlling the ratio rate controls the engine speed.

Through the separate control of the engine torque and engine speed, the operation of the engine at points along any operating line can be achieved. Furthermore, improved control of the transient response of the engine can be achieved.

Figure 3:
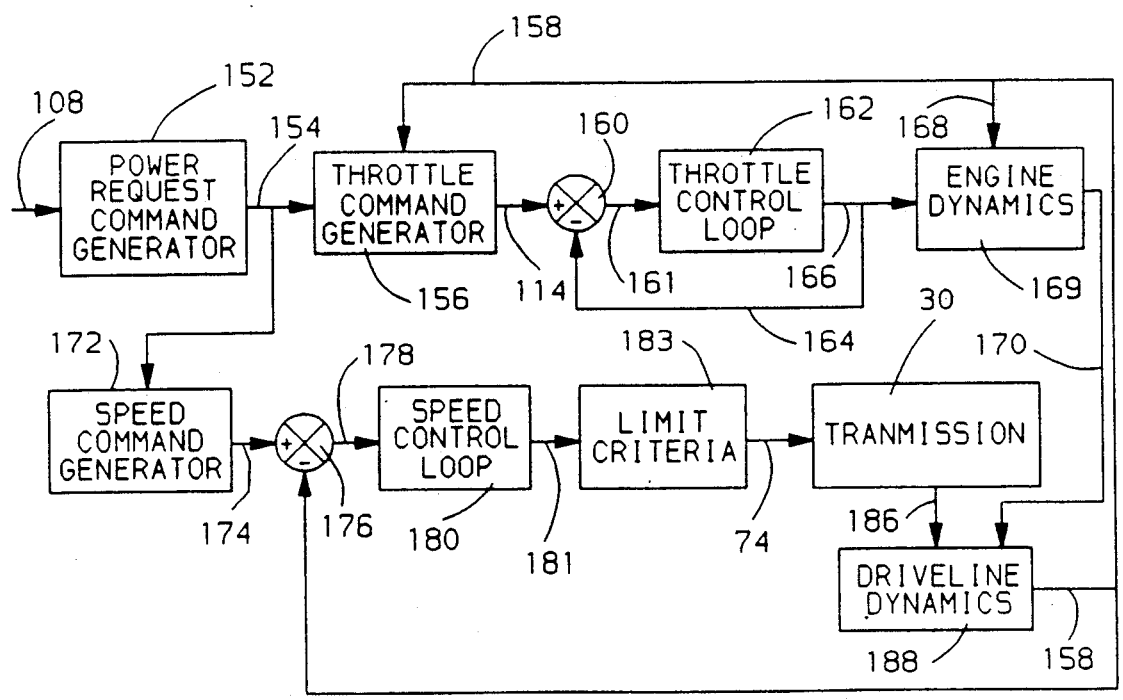
FIG. 3 is a control diagram showing control of the engine torque through throttle control and engine speed through ratio rate control.

A preferred implementation of the present invention can be understood with reference to the controls diagram in FIG. 3. The driver signal from the gas pedal (not shown) on line 108 is used as the input to a power request command generator 152. The power request command generator 152 may be as simple as a look-up table in the controller memory. The power request command generator 152 outputs a power command signal on line 154. The power command signal on line 154 is input into the throttle command generator 156. A measure of actual engine speed on line 158 is also input into the throttle command generator 156. The throttle command generator 156 generates, as a function of power command and actual engine speed, a throttle position command on line 114. The throttle command generator 156 may be a two dimensional look-up table in computer memory. The throttle position command on line 114 is input into comparison block 160 which compares the actual throttle position on line 164 to the throttle position command and outputs a throttle error signal on line 161.

The throttle error signal is input into throttle control loop 162 which controls the position of the throttle 118 (FIG. 2). The throttle control loop 162 may consist of a PID controller, but is not limited to such a controller. The actual throttle position, represented by line 166 controls the torque output of the engine, represented by block 169. The output power of the engine, represented by line 170, affects the vehicle driveline dynamics, represented by box 188.

The power command signal on line 154 is also input into the speed command generator 172, which outputs a speed command signal on line 174. The speed command generator 172 may consist of a look-up table in controller memory. The speed command signal on line 174 is input into the comparison block 176, which compares the speed command to actual engine speed on line 158. An error signal is output on line 178 which is fed into the speed control loop 180. The speed control loop may be a simple PID controller but is not so limited. The speed control loop outputs a ratio rate command on line 181. The ratio rate command is limited by a limit function in box 183 as will be explained below. The ratio rate command is then output on line 74 and controls the ratio rate of the CVT 30. Line 186, leading into box 188, illustrates that the ratio rate of the CVT affects the driveline dynamics of the vehicle controlling the actual engine speed represented by line 158.

Figure 4:
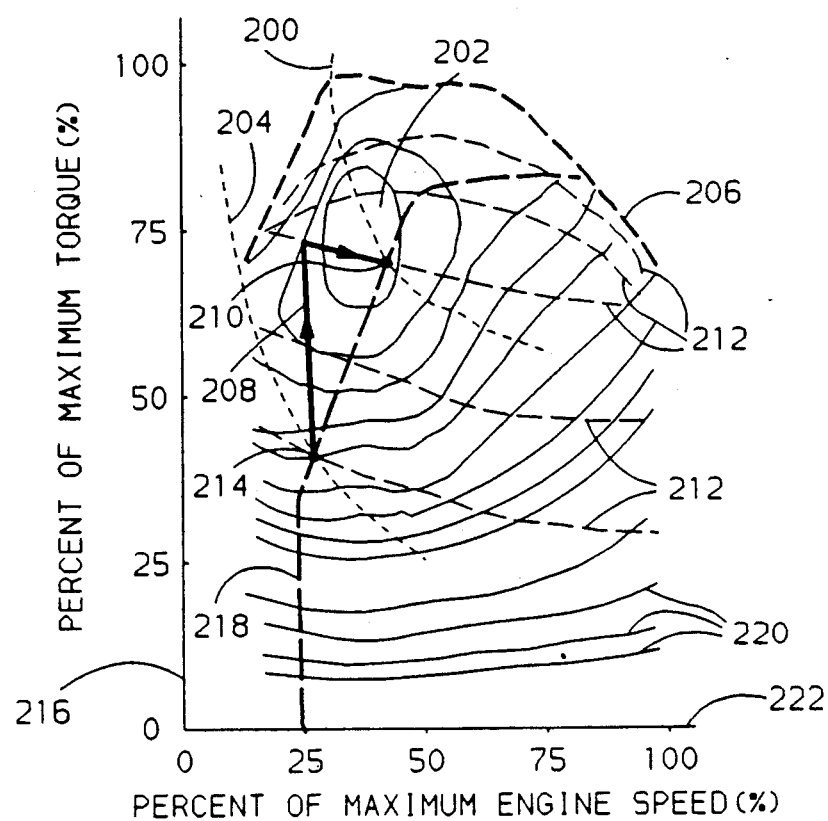
FIG. 4 is an engine map illustrating one mode of how the invention can be used to control the transient response of the engine-CVT system.

The present invention is disclosed in combination with a method of control that includes two modes of operation of the transient response of the engine 120. The response mode illustrated by FIG. 4 is referred to as "economy mode." In FIG. 4, the vertical axis 216 represents the percent maximum torque output of the engine. The horizontal axis 222 represents the percent maximum engine speed. The lines designated by the number 220 represent the constant efficiency lines of the engine. Island 202 is a high efficiency operating zone of the engine. The constant efficiency lines closer to the island 202 represent higher engine efficiencies. Lines 212 are constant throttle position lines. Lines 200 and 204 are constant power lines. Line 218 is the selected operating line of the engine. Choice of operating line is determined by the desired type of operation of the engine. Operating line 218 is designed to provide increased fuel economy from the engine.

The engine in a vehicle is operated along the operating line 218 for highest engine efficiency. Because of the continuous nature of the CVT, any point along the operating line 218 can be achieved. The engine speed and torque commands described above determine the path the engine takes when it is between two points on the operating line.

In economy mode the control works as follows. The engine is assumed to be operating at a first power level at point 214 on the operating line 218. If the operator depresses the gas pedal, indicating desired higher power from the engine, a point 210, corresponding to the higher power level, is determined. Point 210 is determined from the intersection of the operating line 218 and the constant power line 200 representing the desired power level. Once point 210 is determined, the desired engine speed, engine torque, and throttle position required to achieve the desired engine torque are all easily determined, as from a look-up table of the engine map programmed into computer memory.

Once the desired throttle position is determined, the controller moves the throttle to the desired throttle position increasing the engine output torque. Path 208 is the theoretical response path of the engine, and the vertical portion of the path indicates the increased torque that occurs when the throttle is opened. The actual response path of the engine may differ from the theoretical path depending on the dynamics of the particular engine.

The controller controls the ratio rate of the CVT to allow the engine speed to obtain the desired engine speed. The path 208 also indicates how the transient response of the engine is controlled by the ratio rate of the CVT. To accelerate the engine, the ratio rate of the CVT is decreased, and to decelerate the engine, the ratio rate of the CVT is increased.

Although not illustrated in the figure, deceleration of the engine occurs in a manner similar to acceleration. The desired point along the operating line is determined. The throttle opening is then reduced to decrease the torque output of the engine, and the ratio rate of the CVT is increased to slow the engine speed.

Figure 5:
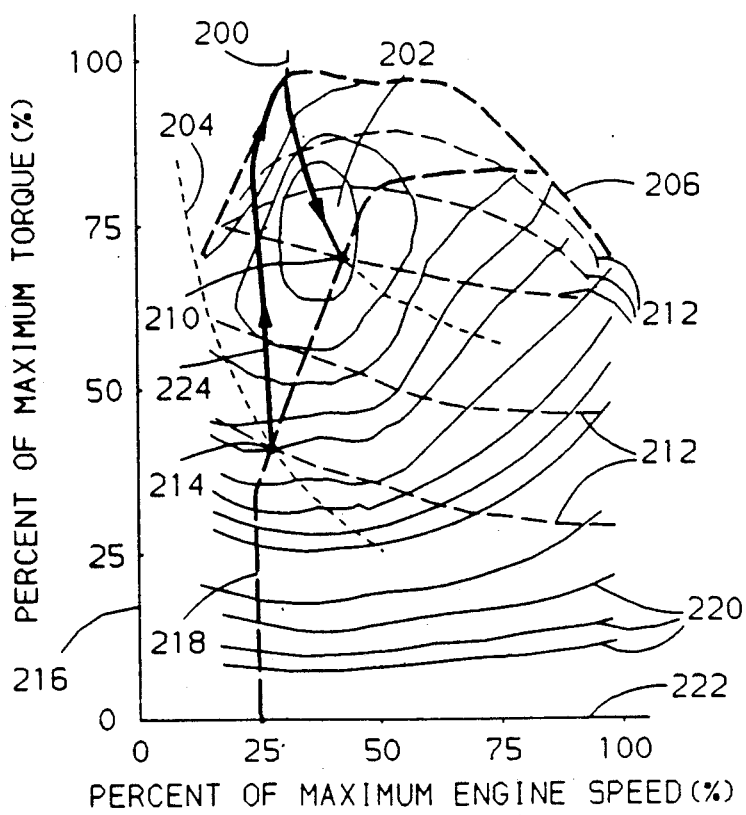
FIG. 5 is an engine map illustrating a second mode of how the invention can be used to control the transient response of the engine-CVT system.

The response mode illustrated in FIG. 5 shall be referred to as "performance mode." The performance mode differs from the economy mode only during engine acceleration. When the gas pedal is depressed, indicating desired increased power from the engine, the controller determines a desired operating point 210 on the operating line 218 as in the economy mode. The ideal throttle position corresponding to operating point 210 is determined as in the economy mode. While the engine speed is increasing from point 214 to 210, the instantaneous engine speed and the power demand (indicated by amount of gas pedal depression) are used to compute the desired instantaneous engine torque (the intersection of the line representing the instantaneous engine speed and the constant power line representing the power demand). A throttle angle command is generated to be either the throttle position which would raise the engine output torque to the desired instantaneous engine torque or the wide open throttle position, whichever is less. In the example illustrated in FIG. 5, the throttle angle command is for the wide open throttle position.

After the desired throttle position is determined, the controller opens the throttle to the desired position, here the wide open position. The controller then controls the ratio rate of the CVT to allow the engine to accelerate to the desired engine speed. Once a point along the constant power line 200, which is equal to the power level at desired operating point 210, is reached, the throttle is gradually closed. As this occurs, the desired throttle position approaches the ideal throttle position, moving the operating point of the engine to the desired point 210. Path 224 represents the transient response path of the engine in performance mode.

As can be seen, using control of the ratio rate of the CVT to control the engine speed provides a flexible tool to control the transient response of the engine. It will also be noted that throttle position may have an affect on engine speed. Even in such cases, the invention provides independent control of engine speed. Since the ratio rate control is directly responsive to engine speed, the ratio rate controller takes into account any affect on engine speed caused by throttle position, therefore providing independent control of engine speed regardless of engine torque.

In the most preferred implementation, the invention is used in combination with a means to limit the ratio rate of the CVT to prevent undesired vehicle deceleration which may occur during periods of desired acceleration and undesired vehicle acceleration during periods of desired deceleration.

The ratio rate is limited as follows. The equation of vehicle acceleration can be described as:

$$A = (RT_e - T_{rd} - T_l)/(I_v + R^2 I_e) - (VRI_e R')/(I_v + R^2 I_e) \quad (1)$$

where A is the vehicle acceleration, R is the CVT ratio, $T_e$ is the engine torque, $T_{rd}$ is the road load torque, $T_l$ is the torque losses of the drivetrain, $I_v$ is the vehicle inertia, $I_e$ is the engine inertia, and R' is the ratio rate of the CVT. During positive acceleration, the ratio rate, R', must be limited to prevent undesired deceleration. The following inequality defines the upper limit of the ratio rate, R', to prevent undesired deceleration during periods of desired acceleration:

$$R' < (RT_e - T_{rd} - T_l)/(VRI_e) \quad (2)$$

During periods of desired deceleration, the ratio rate is negative. The following inequality defines the lower limit of the ratio rate, R', to prevent undesired acceleration during periods of desired deceleration:

$$-R' < (T_{rd} - RT_e + T_l)/(VRI_e) \qquad (3)$$

The above two limits on the ratio rate, R', can be easily imposed by the controller.

Figure 6:
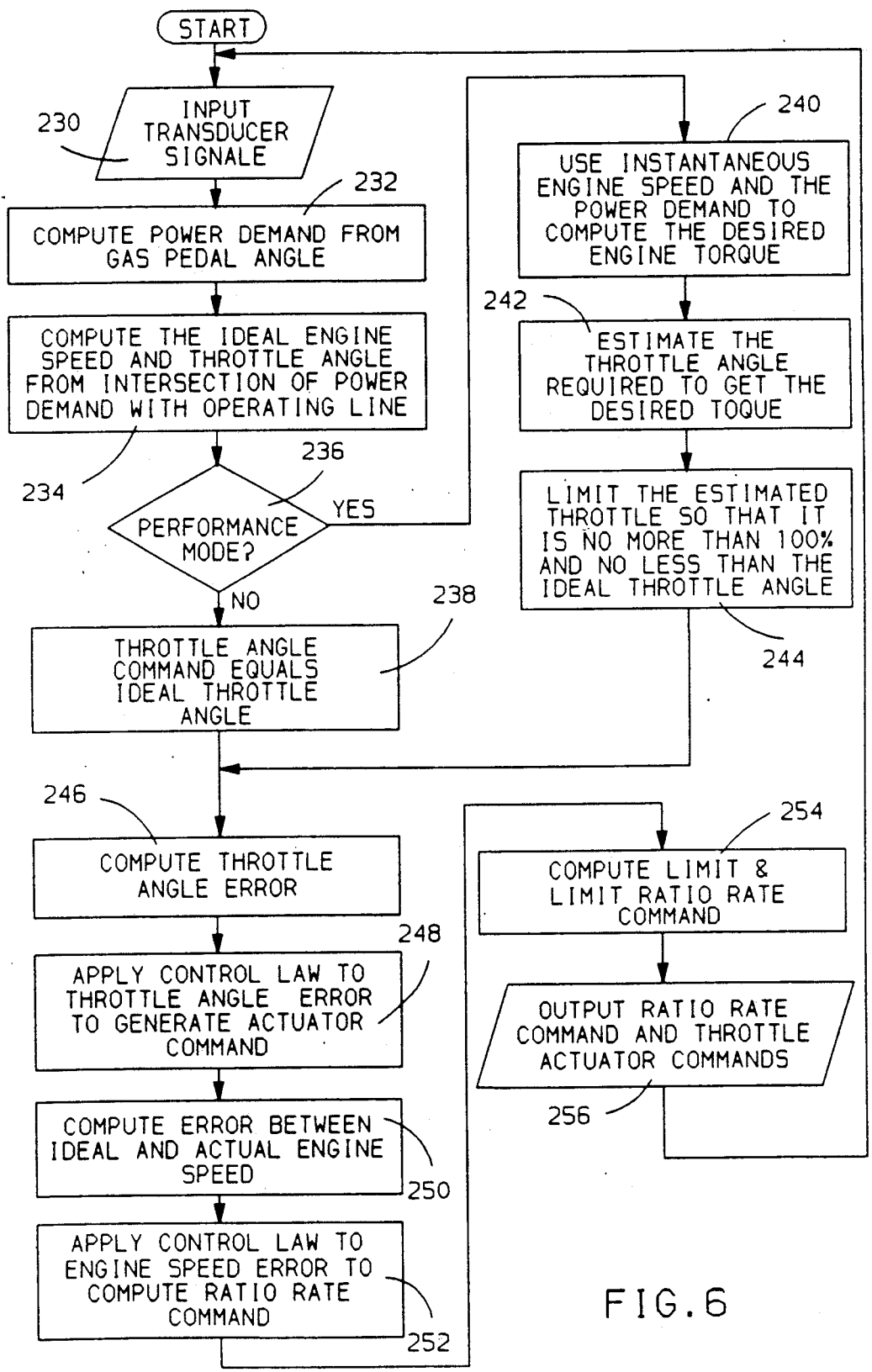
FIG. 6 is a flow chart of a control routine implementing the invention.

The flow diagram in FIG. 6 illustrates a control routine of the preferred implementation of the present invention. At input box 230, the controller inputs information of: gas pedal position, transmission shift position (Park, Neutral, Drive, Reverse), performance mode, engine speed, output shaft speed, and throttle position.

In box 232, the controller computes the operator power demand from the position of the gas pedal. At box 234, the controller computes the ideal engine speed and throttle angle from the intersection of the ideal operating line and the power line equal to the power demand. The controller next determines, at box 236, whether the operator has chosen performance or economy mode.

In economy mode, the throttle angle command is made equal to the ideal throttle angle at box 238. At box 246, the throttle angle error is computed from the actual throttle angle and the throttle angle command. At box 248, a simple control routine is utilized to compute an actuator command.

The error between the ideal and actual engine speed is computed at box 250. At box 252, a simple control routine is utilized to compute a ratio rate command. A ratio rate limit, as discussed above, is computed at box 254 and imposed on the ratio rate command. The ratio rate command and throttle actuator command are both output at box 256, the ratio rate command controlling the ratio rate of the CVT which controls the engine speed, and the throttle actuator command controlling the position of the throttle, controlling the engine output torque.

If the controller determines, at box 236, that the operator desires performance mode, then the throttle angle is computed as follows. The instantaneous engine speed and the power demand are used to compute the desired engine torque at box 240. At box 242, the controller estimates the throttle angle necessary to achieve the desired engine output torque. At box 244, the throttle angle command is computed so that it is no more than wide-open throttle and no less than the ideal throttle angle. The controller then computes throttle angle error at box 246 and controls the throttle position and ratio rate as in the economy mode.

The above flow diagram illustrates just one implementation of the present invention. The present invention not limited to the use of the two modes described above. Instead the present invention is directed to the use of CVT ratio rate control to independently control engine speed with or without engine throttle control to independently control engine torque. The above description illustrates the benefits of the present invention, including improved control over the transient response of the engine-CVT drivetrain.

Many modifications to the above described invention will occur to those skilled in the art, and systems incorporating such modifications may fall within the scope of this invention which is defined by the claims below.

The embodiments of the invention in which an exclusive property or privilege is claimed are defined as follows:

1. In a CVT control system, for a vehicle drivetrain with an engine having various engine speeds, including ratio control means having an input element positionable in response to a control signal to establish various speed ratios between input and output shafts of the CVT and various ratio rates of the CVT and controller means developing the control signal for positioning the input element in response to operator demand, the improvement wherein the controller means (1) develops a command indicative of a desired engine speed in response to operator power demand, (2) compares the command to a measure of the actual engine speed, (3) develops the control signal in a manner determined as a function of the comparison, and (4) applies the control signal to the input element, affecting a direct control of the ratio rate and hence engine speed, in response to the operator demand.

2. In a powertrain control system including an engine having engine speed and a positionable throttle, a CVT including a ratio control means having an input element positionable in response to a control signal to establish various speed ratios between input and output shafts of the CVT and various ratios rates of the CVT, and controller means developing the control signal for positioning the CVT input element and the throttle in response to operator demand, the improvement wherein:

the controller generates desired engine speed and throttle position commands in response to operator power demand;
 the controller positions the throttle to said desired throttle position, thereby controlling engine torque;
 the controller compares the desired engine speed to a measure of the actual engine speed;
 the controller develops the control signal in a manner determined as a function of the comparison; and
 the controller applies the control signal to the input element to affect a direct control of the ratio rate, and hence engine speed, in response to the operator demand.

3. A control method for a vehicle drivetrain including a variable speed engine and a CVT including a ratio control element positionable in response to a control signal to establish various speed ratios between input and output shafts of the CVT and various ratio rates of the CVT, the control method comprising the steps of:

developing a command indicative of a desired engine speed in response to operator power demand;
 comparing the command to a measure of the actual engine speed;
 developing a control signal in a manner determined as a function of the comparison; and
 applying the control signal to the ratio control element to affect a direct control of the ratio rate and hence engine speed, in response to operator demand.

4. A control method for a vehicle drivetrain including a variable speed engine having a positionable throttle and a CVT having a ratio control element positionable in response to a control signal to establish various speed ratios between input and output shafts of the CVT and various ratio rates of the CVT, the control method comprising the steps of:

developing a command indicative of a desired engine speed in response to operator power demand;

comparing the command to a measure of the actual engine speed;

developing a control signal in a manner determined as a function of the comparison; and applying the control signal to the ratio control element to affect a direct control of the ratio rate and, in conjunction with throttle position, a direct control of engine speed, in response to operator demand.

5. A control method for a vehicle drivetrain including a variable speed engine having a positionable throttle and a CVT having a ratio control element positionable in response to a control signal to establish various speed ratios between input and output shafts of the CVT and various ratio rates of the CVT, the control method comprising the steps of:

developing desired engine speed and throttle position commands in response to operator power demand;

positioning the throttle to said desired throttle position, thereby controlling engine torque and affecting engine speed;

comparing the desired engine speed to a measure of the actual engine speed;

developing a control signal in a manner determined as a function of the comparison; and applying the control signal to the ratio control element to affect a direct control of the ratio rate and, in conjunction with throttle position, a direct control over engine speed, in response to the operator demand.

* * * * *